US012569872B2

(12) United States Patent
Steiger et al.

(10) Patent No.: US 12,569,872 B2
(45) Date of Patent: Mar. 10, 2026

(54) COATING BOOTH FOR COATING VEHICLE RIMS

(71) Applicant: GEMA SWITZERLAND GMBH, St. Gallen (CH)

(72) Inventors: Peter Steiger, Gossau (CH); Paulo Dos Reis, St. Gallen (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 728 days.

(21) Appl. No.: 17/995,924

(22) PCT Filed: Apr. 6, 2021

(86) PCT No.: PCT/EP2021/058923

§ 371 (c)(1),
(2) Date: Oct. 10, 2022

(87) PCT Pub. No.: WO2021/204791

PCT Pub. Date: Oct. 14, 2021

(65) Prior Publication Data

US 2023/0182160 A1 Jun. 15, 2023

(30) Foreign Application Priority Data

Apr. 8, 2020 (DE) ..................... 10 2020 109 819.7

(51) Int. Cl.
*B05B 13/04* (2006.01)
*B05B 12/18* (2018.01)
(Continued)

(52) U.S. Cl.
CPC .......... *B05B 13/0457* (2013.01); *B05B 12/18* (2018.02); *B05B 13/0235* (2013.01);
(Continued)

(58) Field of Classification Search
None
See application file for complete search history.

(56) References Cited

U.S. PATENT DOCUMENTS

2004/0134422 A1* 7/2004 Ziwica ................ B05B 13/0447 118/308
2007/0110911 A1* 5/2007 Steiger ................ B05B 13/0447 427/427.3

(Continued)

FOREIGN PATENT DOCUMENTS

CN 105142799 A 12/2015
DE 10359280 A1 7/2005

(Continued)

OTHER PUBLICATIONS

English translation of DE102012214321.*

(Continued)

*Primary Examiner* — Charles Capozzi
(74) *Attorney, Agent, or Firm* — Kinney & Lange, P.A.

(57) ABSTRACT

A coating cabin for coating vehicle wheel rims has a coating chamber and a conveying device for transporting the workpieces for coating through the coating chamber. An applicator system is furthermore provided for spraying coating material as required in the coating chamber, wherein the applicator system has a first pistol system for spraying coating material as required onto a first region of the workpieces for coating, a second pistol system for spraying coating material as required onto a second region of the workpieces for coating, and a third pistol system for spraying coating material as required onto a third region of the workpieces for coating.

18 Claims, 3 Drawing Sheets

(51) Int. Cl.

| | |
|---|---|
| ***B05B 13/02*** | (2006.01) |
| ***B05B 14/41*** | (2018.01) |
| ***B05B 14/48*** | (2018.01) |
| ***B05B 15/70*** | (2018.01) |
| ***B05B 16/00*** | (2018.01) |
| ***B05B 16/40*** | (2018.01) |

(52) U.S. Cl.
CPC .............. *B05B 14/41* (2018.02); *B05B 14/48* (2018.02); *B05B 15/70* (2018.02); *B05B 16/40* (2018.02); *B05B 16/90* (2018.02)

(56) References Cited

U.S. PATENT DOCUMENTS

| | | | | |
|---|---|---|---|---|
| 2014/0030439 | A1* | 1/2014 | Schmidt | B05B 13/0221 427/427.2 |
| 2016/0122138 | A1 | 5/2016 | Mauchle et al. | |
| 2019/0151883 | A1* | 5/2019 | Tsui | B05B 15/70 |
| 2020/0147629 | A1* | 5/2020 | Liu | B05B 15/68 |
| 2020/0269269 | A1 | 8/2020 | Studerus et al. | |

FOREIGN PATENT DOCUMENTS

| | | | |
|---|---|---|---|
| DE | 20321762 | U1 | 8/2009 |
| DE | 102012214321 | A1 | 5/2014 |
| EP | 2272593 | A1 | 1/2011 |
| EP | 3459642 | A1 | 3/2019 |
| WO | 2005058508 | A1 | 6/2005 |

OTHER PUBLICATIONS

English translation of Written Opinion of the International Search Authority dated Sep. 6, 2021, for corresponding PCT Application No. PCT/EP2021/058923.

International Preliminary Report on Patentability dated Oct. 6, 2022, for corresponding PCT Application No. PCT/EP2021/058923.

German Office Action dated Nov. 20, 2020, for corresponding German Application No. 10 2020 109 819.7.

International Search Report and Written Opinion dated Sep. 6, 2021, for corresponding PCT Application No. PCT/EP2021/058923.

First Office Action dated Dec. 25, 2025, for corresponding Chinese Patent Application No. 2021/0025372.8, 10 pgs.

* cited by examiner

COATING BOOTH FOR COATING VEHICLE RIMS

CROSS-REFERENCE TO RELATED APPLICATION(S)

This application is the national phase of PCT Application No. PCT/EP2021/058923 filed on Apr. 6, 2021, which claims priority to German Application No. 10 2020 109 819.7 filed on Apr. 8, 2020, the contents of which are incorporated herein by reference in their entirety.

BACKGROUND

The present disclosure relates in general to the coating of workpieces and in particular to the coating of rotationally symmetric workpieces, particularly vehicle rims, with coating material, in particular coating powder.

One aspect of the present disclosure relates to a coating booth optimized for the coating of such workpieces while a further aspect of the disclosure relates to a system for coating such workpieces.

Coating booths for coating workpieces, in particular with coating powder, are known in general from the prior art. Such coating booths usually comprise a coating chamber having a booth floor, two oppositely positioned workpiece passageways as well as a conveyor device for transporting workpieces to be coated through the coating chamber. The conveyor device is usually arranged beneath the booth floor of the coating booth and has a workpiece carrier which extends into the coating chamber of the coating booth through a conveyance slot in the booth floor.

Coating booths having such "floor conveyors" are particularly used in the coating of high-quality workpieces since high coating quality can be achieved by arranging the conveyor device beneath the booth floor. This is particularly due to the fact that "traditional" conveyors for the suspended transport of workpieces through the coating chamber can facilitate the falling of dirt particles or powder residues from the conveyor device, which can lead to irregularities in the coating.

A spray coating apparatus serving in the spraying of coating powder onto the front sides of vehicle rims is known from printed publication DE 103 59 280 A1. The apparatus comprises a floor conveyor with consecutively arranged motor-rotatable spindles, each supporting one of the vehicle rims on its upper receiving surface. The system comprises four spraying stations, whereby two spray guns are in each case diametrically arranged above a rim on each of the spraying stations in stationary and non-rotatable manner. The spray guns are directed vertically downward so as to spray coating powder onto the front sides of the vehicle rim below while the spindle rotates jointly with the vehicle rim about the vertical axis of rotation at the spraying station. Two further upward-directed stationary spray guns are provided for coating the rear side of the rim.

In one embodiment, the floor conveyor runs intermittently; i.e. it stops while the rim is being coated. This has the disadvantage of the floor conveyor needing to be stopped every time a vehicle rim is to be coated. After the vehicle rim has been coated, the floor conveyor first needs to restart and then stop again as soon as the next vehicle rim reaches the coating station.

In another embodiment, the floor conveyor is continuously moved past the stationary spray guns, even while the vehicle rims are being coated. The floor conveyor needs to move extremely slowly in order for the vehicle rims to be able to be coated with sufficient coating powder.

Both embodiments have the disadvantage of the number of vehicle rims able to be coated per unit of time being relatively limited. Although this can be countered by using a plurality of spraying stations, doing so has the disadvantage of needing a relatively large installation space for the entire coating system as a whole.

SUMMARY

The present disclosure is based on the task of specifying a coating booth as well as a system for coating in particular rotationally symmetric workpieces, in particular vehicle rims, with coating material, in particular coating powder, wherein the coating booth or coating system respectively can be used as flexibly and automatically as possible and yet still deliver optimum productivity and economy.

Accordingly, the disclosure relates in particular to a coating booth for coating in particular rotationally symmetric workpieces, in particular vehicle rims, with coating material, in particular coating powder, wherein the coating booth comprises a coating chamber and a conveyor device for transporting the workpieces to be coated through the coating chamber. The coating chamber of the disclosed coating booth has a booth floor, two oppositely positioned side walls, each having a workpiece passageway, two side walls oppositely positioned and adjoining the side walls with the workpiece passageways, as well as a booth roof positioned opposite from the booth floor. The conveyor device, which serves in transporting the workpieces to be coated through the coating chamber, is arranged beneath the booth floor and has a workpiece carrier which extends into the coating chamber of the coating booth through a conveyance slot in the booth floor.

The coating booth according to the disclosure furthermore makes use of an applicator system for spraying coating material within the coating booth as needed. The applicator system comprises a first gun system for spraying coating material as needed onto a first area of the workpieces to be coated, a second gun system for spraying coating material as needed onto a second area of the workpieces to be coated, as well as a third gun system for spraying coating material as needed onto a third area of the workpieces to be coated.

The first gun system of the applicator system is thereby in particular designed to spray coating material as needed onto a visible area of the workpieces to be coated. To be understood by the term "visible area" as used herein is the so-called A-side of the workpiece when the workpiece is used as intended. With vehicle rims, the visible side is thus to be understood as the outward visible surface. The second area represents the rim well, for example, and the third area represents the side of the vehicle rim opposite from the visible side.

The second gun system of the applicator system is designed to spray coating material as needed onto a side region of the workpieces to be coated adjacent to the visible area. In contrast, the third gun system is designed to spray coating material as needed onto a rear area of the workpieces to be coated opposite from the visible area.

In particular provided with the coating booth according to the disclosure is the assigning of an axis or respectively positioning system to the first gun system for the positioning and/or aligning of the first gun system relative to the workpieces to be coated during a coating procedure. A second axis system is assigned to the second gun system for the positioning and/or aligning of the second gun system relative to the workpieces to be coated during a coating procedure, while a third axis system is assigned to the third gun system for the positioning and/or aligning of the third gun system relative to the workpieces to be coated.

According to preferential implementations of the disclosed coating booth, the first, second and third axis or positioning system are each designed as a system which travels along with the workpieces to be coated as the workpieces to be coated are transported through the coating chamber. Each axis/positioning system can thereby move relative to the coating chamber along the side walls adjoining the side walls with the workpiece passageways, whereby the axis/positioning systems are designed so as to move synchronously or asynchronously to a conveying speed of the conveying device.

Particularly provided is for the second and third axis system to each be connected to the respectively assigned gun system via an opening formed in a side wall adjacent to the side walls with the workpiece passageways, whereby the second and third axis system are preferably connected to the respectively assigned gun system via the same opening in a side wall adjoining the side walls with the workpiece passageways.

According to preferential implementations of the present disclosure, it is provided for only the first gun system to move asynchronously to the traveling conveyor device whereas the second and third gun system move synchronously with the conveyor movement.

Preferably, the first, second and third axis system each have a gun system or multiple gun systems and preferably two gun systems each. So doing enables achieving a higher throughput of workpieces to be coated because multiple workpieces can always be coated at the same time.

The second and third axis systems advantageously have a common transport device for jointly moving the second and third gun system relative to the coating chamber and synchronously with the workpieces to be coated and transported through the coating chamber via the conveyor device.

In contrast, the first axis or positioning system is to have a transport device independent of the second and third axis system which is designed to move the first gun system relative to the coating chamber and asynchronously to the workpieces to be coated which are transported through the coating chamber via the conveyor device and in particular independently of the joint transport device of the second and third axis system.

Preferential implementations of the disclosed coating booth provide for assigning a robotic arm system to the first axis system which is able to be moved together with the first gun system over the conveyor device, and in particular over the workpieces to be coated, and preferably on the booth roof, relative to the coating chamber and in particular asynchronously to a transport movement of the workpieces to be coated with the aid of robotic guidance.

While the first axis or positioning system is preferentially assigned a robotic arm system, the second and third axis system are each assigned a linear positioning system for the in particular independent positioning and/or aligning of the second and third gun system relative to the workpieces to be coated.

Preferentially, the first axis or positioning system is assigned a control device designed to control the first axis system and in particular a robotic arm system assigned to the first axis system such that the coating guns of the first gun system each have a predefined and/or definable position and/or alignment relative to the workpieces to be coated, wherein said predefined and/or definable position and/or alignment depends in particular on the type and/or size of the workpieces to be coated.

The first gun system preferentially comprises at least one first coating gun and at least one further second coating gun, whereby the at least one first coating gun is movable and/or alignable relative to the workpieces to be coated independently of the at least one further second coating gun. The first gun system preferably has at least two further coating guns, whereby the at least two further coating guns are movable and/or alignable relative to the workpieces to be coated independently of one another.

Similarly, it makes sense for the second gun system to exhibit at least one first coating gun and at least one further second coating gun, whereby the at least one first coating gun is preferably movable and/or alignable relative to the workpieces to be coated independently of the at least one further second coating gun. Alternatively or additionally thereto, it can be provided for the third gun system to have at least one first coating gun and the at least one further second coating gun, whereby the at least one first coating gun is preferably movable and/or alignable relative to the workpieces to be coated independently of the at least one further second coating gun.

The coating guns are preferably electrostatic coating guns designed to electro-statically charge the coating material to be sprayed with the coating gun. Preferential implementations of the disclosed coating booth provide for the coating guns to be assigned a control device for the controlling and/or regulating of the currents in the coating material charging process. The control device is in particular designed to regulate current values below 10 μA in at least 0.5 μA increments.

With respect to the coating booth, it is advantageously provided for at least sections of the booth floor surrounding the conveyance slot to be of ramped design, whereby at least one air blowing device is provided for the preferably pulsed blowing of a flow of air along the ramped section of the booth floor off toward at least one extraction duct provided in the booth floor. Advantageously, the at least one air blowing device is provided at the conveyance slot.

Preferably, use is made of at least one further air blowing device on or in at least one side wall of the coating booth adjoining the side walls with the work-piece passageways. The further air blowing device is in particular designed for the preferably pulsed blowing of a flow of air along the booth floor off toward the at least one extraction duct provided in the booth floor.

The disclosed system for coating in particular rotationally symmetric workpieces, particularly vehicle rims, with coating material, in particular coating powder, comprises a coating booth of the aforementioned disclosed type as well as a coating material supply for supplying coating material to the gun systems of the applicator system. The coating material supply is thereby in particular designed to only supply fresh coating material to the first gun system and to supply fresh coating material along with recovery material or only recovery material to the second and third gun system.

The term “recovery material” as used herein is to be understood as coating material which has already been sprayed at least once during a coating procedure and suitably recycled. Such recovery material is sometimes also referred to as “overspray material.”

Further developments of the disclosed coating system provide for the coating material supply to preferably have at least one coating material pump for each gun system, wherein the coating material pump is preferably based on the dense flow principle and designed for continuous coating material conveyance.

BRIEF DESCRIPTION OF THE DRAWINGS

The following will reference the accompanying drawings in describing an exemplary embodiment of the disclosed coating booth in greater detail.

Shown are.

DETAILED DESCRIPTION

The embodiments of the disclosure will be described in greater detail below in the context of a coating booth 1 for the powder coating of vehicle rims 2.

The current industrial production practices of original equipment manufacturers of light-alloy wheels for passenger cars (vehicle rims 2) rely heavily on powder-coated surface coating. The main advantages such as impact resistance, scratch resistance, high corrosion protection and easy care thereby make it worthwhile. In addition to thorough pre-treatment of the parts and the controlled curing of the powder coating, the powder application, i.e. the application of the coating powder to the metal surface, is particularly crucial to the quality, flexibility and productivity of the powder coating process. Thereby playing a major role is, on the one hand, the electrostatic charging capacity of the coating guns used as sprayers and, on the other, a booth system tailored to the coating of the rims.

Secondly, the producers of vehicle rims are faced with ever increasing demands brought about by increasing customization, color and rim type options, differing sizes and increased quality standards.

The disclosed coating booth 1, which is described in greater detail below on the basis of an exemplary embodiment with reference to the drawings, meets these needs and in particular enables flexible and automated coating at optimum productivity and economy.

Figure 1:
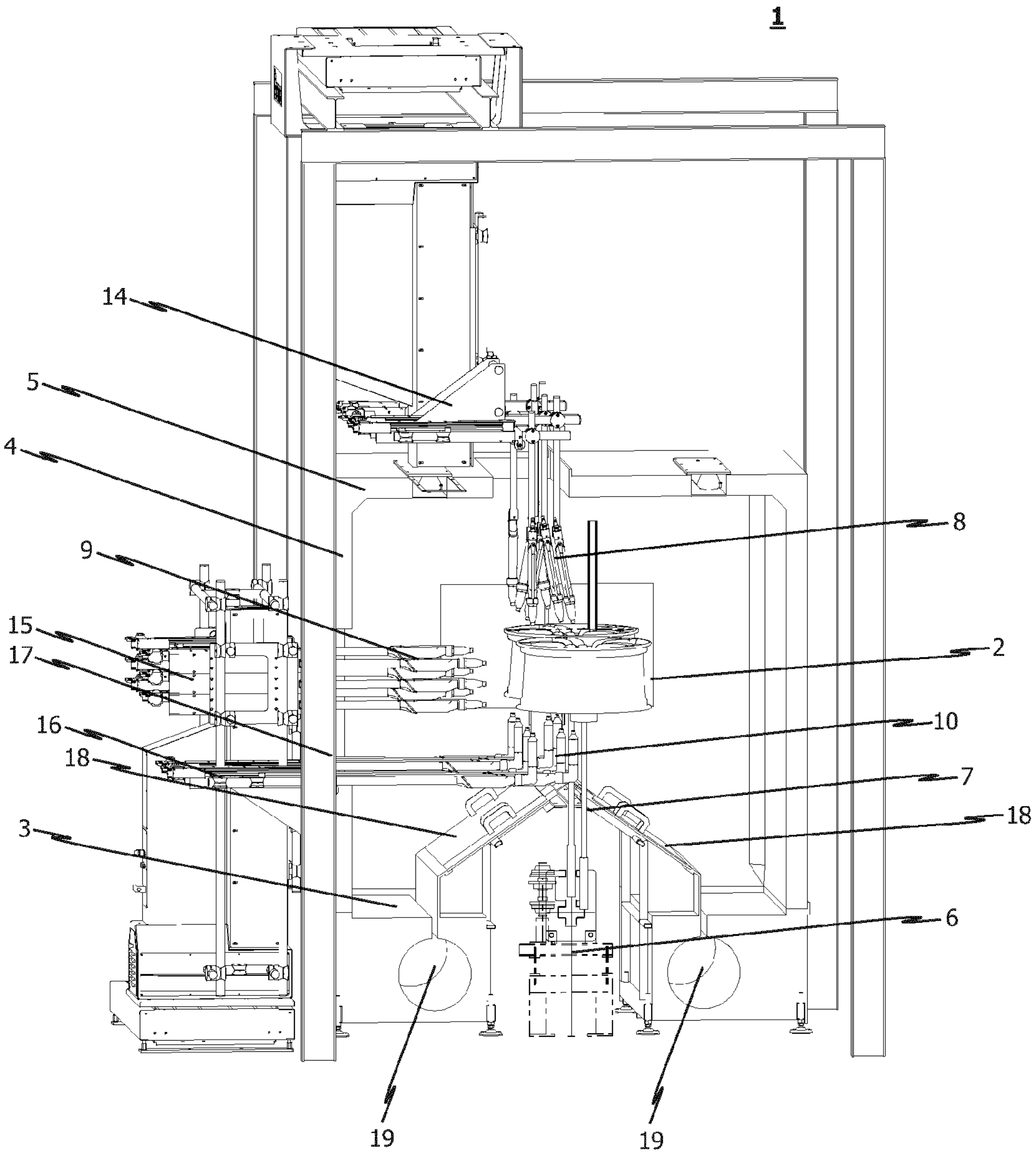
FIG. 1 a schematic and partially sectioned view of an exemplary embodiment of the coating booth according to the disclosure.

The exemplary embodiment of the disclosed coating booth 1, as shown in a schematic and partially sectioned view in FIG. 1, essentially comprises a coating chamber which in turn has a booth floor 3, two oppositely positioned side walls, each having a workpiece passageway (not shown in FIG. 1), two side walls 4 oppositely positioned and adjoining the side walls with the workpiece passageways, and a booth roof 5 positioned opposite from the booth floor 3.

A conveyor device 6 is furthermore employed for transporting the workpieces to be coated (here vehicle rims 2). The conveyor device 6 is arranged beneath the booth floor 3 and has a workpiece carrier (spindle 7) which extends into the coating chamber of the coating booth 1 through a conveyance slot in the booth floor 3.

At least sections 18 of the booth floor 3 surrounding the conveyance slot are thereby of ramped design. Air blowing devices are provided for the preferably pulsed blowing of a flow of air along the ramped section 18 of the booth floor 3 off toward extraction ducts 19 provided in the booth floor 3.

In addition, further air blowing devices are preferably provided on or in at least one side wall 4 of the coating booth 1 adjoining the side walls with the workpiece passageways. This at least one further air blowing device is designed for the preferably pulsed blowing of a flow of air along the booth floor 3 off toward the at least one extraction duct 19 provided in the booth floor 3.

The disclosed coating booth 1, as illustrated by the example in FIG. 1, further comprises an applicator system for the spraying of coating material in the coating booth 1 as needed.

In particular provided in this context is for the applicator system to comprise a first gun system 8 with a plurality of coating guns, a second gun system 9 with a plurality of coating guns as well as a third gun system 10 with a plurality of coating guns. The coating guns of the first gun system 8 are thereby provided for spraying coating material as needed onto a first area 11 of the workpieces to be coated (vehicle rims 2), whereas the coating guns of the second gun system 9 serve in spraying coating material as needed onto a second area 12 of the workpieces to be coated, and whereas the coating guns of the third gun system 10 serve in spraying coating material as needed onto a third area 13 of the workpieces to be coated.

Figure 2:
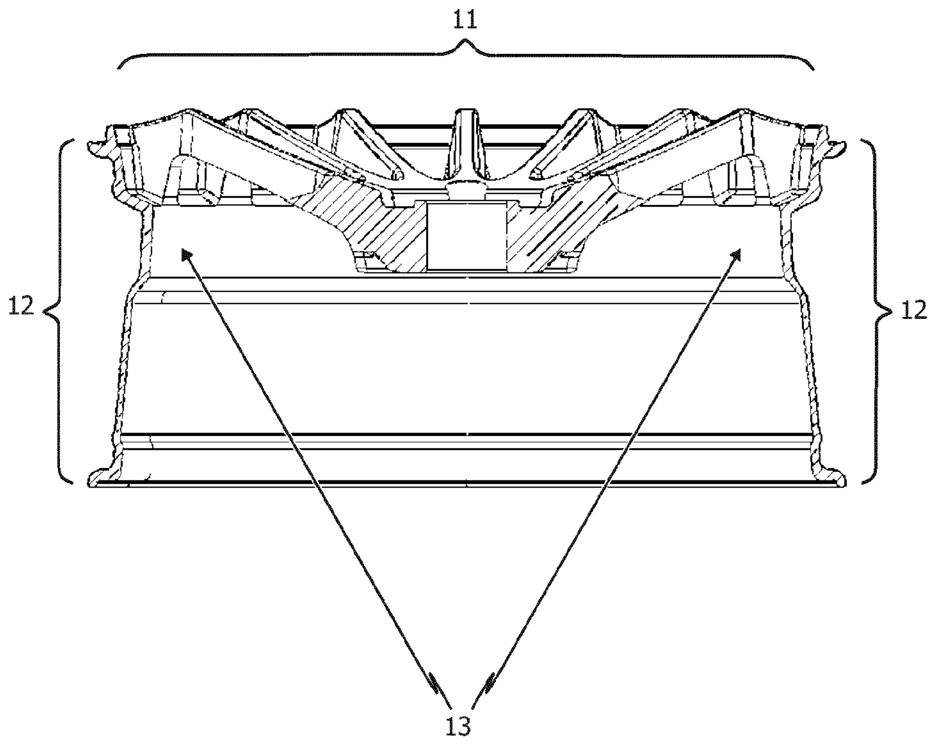
FIG. 2 a schematic sectional view through a workpiece (here a vehicle rim) with the different areas associated with the gun systems of the disclosed coating booth.

An example of the respective areas 11, 12, 13 of the workpiece 2 associated with the guns of the first, second and third gun systems 8, 9, 10 is shown in FIG. 2.

According thereto, the guns of the first gun system 8 serve in particular the spraying of coating material onto a visible area of the workpieces 2 to be coated, whereby the guns of the second gun system 9 serve in the as-needed spraying of coating material onto a side area (rim well) of the workpieces 2 to be coated adjoining the visible area, while the guns of the third gun system 10 serve in the as-needed spraying of coating material onto a rear area of the workpieces 2 to be coated opposite from the visible area.

A first positioning or respectively axis system 14 assigned to the first gun system 8 is used for the positioning and/or aligning of the guns of the first gun system 8. Similarly, the second and third gun system 9, 10 are respectively assigned a second/third axis system 15, 16 for the positioning and/or aligning of the guns of the second and third gun system 9, 10 relative to the workpieces 2 to be coated during a coating procedure.

As indicated in FIG. 1, the second and third axis system 15, 16 are thereby each connected to the coating guns of the respectively associated gun systems 9, 10 via an opening 17 formed in a side wall 4 of the coating booth 1.

In particular, the second and third axis systems 15, 16 have a common transport device for jointly moving the second and third gun systems 9, 10 relative to the coating chamber and synchronously with the workpieces 2 to be coated and transported through the coating chamber via the conveyor device 6.

In the embodiment of the disclosed coating booth 1 shown in FIG. 1, the first axis system 14 has a transport device independent of the second and third axis system 15, 16 which is designed to move the first gun system 8 relative to the coating chamber and asynchronously to the workpieces 2 to be coated transported through the coating chamber via the conveyor device 6.

As with the second and third axis system 15, 16, the first axis or positioning system 14 is assigned a linear positioning system for the positioning and aligning of the coating guns of the first gun system 8.

Alternatively thereto, however, it would also be conceivable for the first axis or positioning system 14 to be assigned a robotic arm system for the positioning and aligning of the coating guns of the first gun system 8.

Figure 3A:
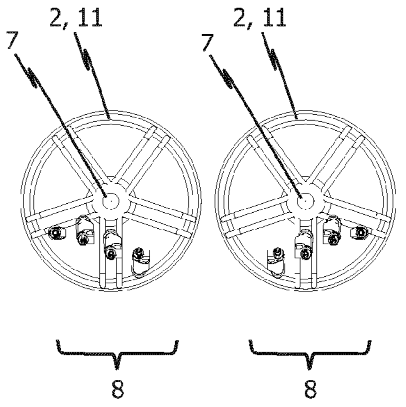
FIG. 3*a* a schematic illustrative positioning of the coating guns of the first gun system with two workpieces to be coated at the same time.
Figure 4A:
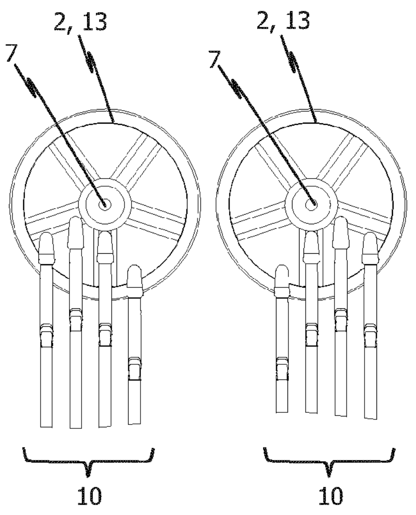
FIG. 4*a* a schematic view of the arrangement of the coating guns of the third gun system of the disclosed coating booth during a coating of two workpieces.

As indicated in FIG. 3*a, b* and FIG. 4*a, b*, the first and third gun system 8, 10 each have at least one first coating gun and at least one further second coating gun, whereby the at least one first coating gun can be moved and/or aligned relative to the workpieces 2 to be coated independently of the at least one further second coating gun of the corresponding gun system 8, 10.

Particularly provided is for the first axis system 14 to be able to be controlled via a suitable control device such that the at least one first coating gun and the at least one further second coating gun each have a predefined and/or definable position and/or alignment to the workpieces 2 to be coated, wherein the pre-defined and/or definable position and/or alignment depends in particular on the type and particularly the size of the workpieces 2 to be coated. The same also applies in the figurative sense to the coating guns of the third gun system 10.

In the coating booth 1 according to the disclosure, which particularly serves in the powder coating of vehicle rims 2, the axis of the rim is in vertical alignment during the powder application; i.e. the vehicle rim is transported in this position through the coating booth 1 on rotatable spindles 7 by means of floor conveyors 6.

This circumstance indicates that the coating booth 1 is specially developed for the coating of rims. In a booth concept, the focus is on the airflow within the booth 1, the scope of the axis systems 14, 15, 16 as well as their integration and, last but not least, the matter of throughput.

Generally speaking, a coating booth 1 has three openings, whereby two of them serve as entrance/exit openings for the transiting vehicle rims 2. Ideally, these openings are concurrently intended as access points into the booth for maintenance needs.

The third booth opening 17 on the side is the actual coating access point to the vehicle rim 2 for the individual guns of the second and third gun systems 9, 10 installed on an axis system 14, 15, 16.

In addition to these physical requirements, the openings 17 also meet the needs of the airflow through the coating booth 1. Based on a filter system, which induces overspray powder to be suctioned off through the air ducts within the booth 1, ambient air flows into the booth 1 through the booth openings. The resulting air currents prevent the powder from escaping the booth 1. The incoming air must thereby not impede the coating process. The side booth opening 17 is correspondingly large for concurrently moving axis systems 14, 15, 16 or when using robots.

On the other hand, the need for smooth and calm airflows in the area of active powder application on the vehicle rim 2 is crucial to the coating result. The vehicle rim 2 is preferably coated over approximately 75% of the total length of the booth by the concurrently moving coating guns. Varied flow conditions are to be expected, particularly at the booth entrances and exits.

The floor conveyor 6, which runs through the coating booth 1, is separated from the interior of the coating booth 1 by an enclosure 18, which can be removed for maintenance purposes. The spindle bushing itself is likewise sealed to prevent coating powder from falling onto the floor conveyor 6.

The enclosure 18 and the floor 3 of the coating booth 1 are automatically and cyclically cleaned of coating powder by a plurality of air blast bars, which is then fed back into the powder circulation as recycled powder. The air blast bars thereby expel air in pulses along the floor surfaces and in the process push the excess powder to the extraction slot or extraction duct 19 respectively. Compared to a permanently active blow-off system, this procedure is on the one hand more effective and, on the other, saves energy costs.

In the disclosed coating booth 1, the workpieces (vehicle rims 2) are coated with powder relative to the movement of the floor conveyor. A higher throughput is thus achieved right from the start versus stop-and-go operation.

During the coating process, an axis system moves all the coating guns relative to the movement of the floor conveyor (i.e. the movement of the vehicle rims 2). The rim 2 itself is thereby in rotation about its own axis. The required conveying speed as well as the length of the booth 1 can be dictated by the coating time of a vehicle rim 2 and the planned throughput per hour.

In the case of a planned future increase in throughput, the maximum conveying speed allowing a certain booth length can be determined in a first step using the same approach. Alternatively and more efficiently, however, is the installation of a second set of guns on the existing axis system. Two vehicle rims 2 are thus coated simultaneously, which in principle corresponds to doubling the throughput while maintaining the booth 1. The advantage of this implementation is that the individual coating parameters such as floor conveyor speed, rim rotation, powder output volume, high voltage and current for coating powder charging and coating programs can continue to be used and thus empirical values can continue to be used.

Viewed from the outside, a cloud of powder subsequently forms during the coating process of a vehicle rim 2 to be coated. The powder spraying guns thereby move relative to the conveyance direction of the vehicle rim 2, entailing a stationary powder cloud relative to the vehicle rim 2. The three rim areas 11, 12, 13 according to FIG. 2 (visible surface with holes, inner surface and rim well) are thereby each associated with a respective gun group 8, 9, 10.

Each of these groups 8, 9, 10 coats on the basis of individual coating parameters. The distances to the vehicle rim 2, the alignments of the guns and their number thereby depend on the rim type (design, size and coating requirements or powder type respectively).

Ideally, a coating system knows the type of rim to be coated and is able to automatically access the necessary system settings using stored programs. The electrostatic coating parameters are thereby stored in the system control as programs based on wheel type or respectively rim type.

Figure 3B:
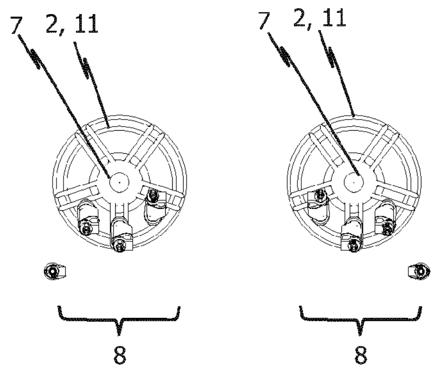
FIG. 3*b* a schematic view of the arrangement of the coating guns of the first gun system during a coating of other smaller workpieces.
Figure 4B:
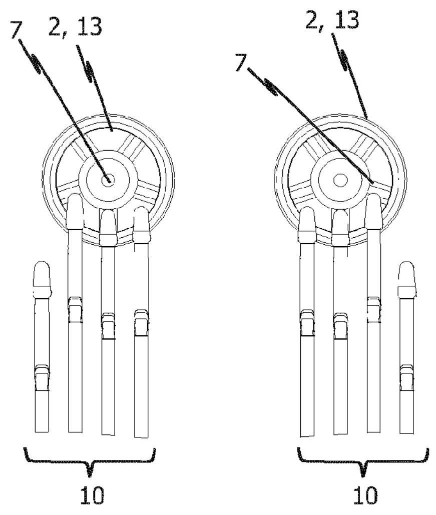
FIG. 4*b* a schematic view of the alignment and arrangement of the coating guns of the third gun system during a coating of other smaller workpieces.

A complex axis system is ideally provided for the positioning of the individual guns or gun groups 8, 9, 10 respectively. Thus, any type of wheel or rim can be coated with the ideal gun positions and number of guns. For example, when coating small workpieces, unneeded coating guns can be parked outside of the operations (cf. FIG. 3*b* and FIG. 4*b*).

For the highest quality optics, particularly of the visible surfaces of the workpieces 2, the powder charging currents should be precisely adjustable in the low range (less than 10

μA) in order to capitalize on the properties of the coating powder. In addition, the deliberate discharging of superfluous free ions optimizes the regularity of the coating pattern; i.e. induced charges in the powder are prevented and the formation of orange peel is staved off.

In particular, only a certain amount of charge is necessary and each type of powder tolerates a different ideal amount to achieve optimum coating quality. Coating powder overcharge reduces application efficiency and tends to induce surface defects. The reasons for this are excessively high field line concentrations or excessively high ion flow per unit of time and area respectively. Back ionization occurs in readily accessible areas (orange peel effect due to back spray), while in more shielded areas the powder layer is too thin.

Powder overcharge should be avoided since the potential of the coating powder otherwise not only remains unused but may even be destroyed. In order to do justice to the properties, a precise regulation of the current values below 10 μA is necessary in order to have a controlled influence on the powder charging efficiency and thus increase the visual surface quality. Regulation in 0.5 μA increments is thereby particularly advantageous.

Working with low charge currents moreover has the effect of a better settling of the powder into depressions, which has a noticeably positive impact with respect to rim holes or spoke gaps.

So-called injectors based on the Venturi principle can be employed for conveying powder from a storage container to the coating guns. With this technology, however, conveyance stability is highly dependent on the condition of the inner components of the injector which come into contact with powder, these being considered wear parts. At high physically-induced speeds, coating powder has an abrasive effect, which ultimately means differing flow rates after just a short time and the consequential replacement of the affected parts (maintenance stop).

In order to avoid this, pumps are preferably used to convey powder. This conveyance technology does not exhibit any such wear behavior. The powder volume remains stable and does not change even over a long period of time.

In order to supply the necessary powder output volume for a coating, the above-cited amounts of fluctuation also need to be taken into account with an injector. Meaning that the actual output is higher than the target value over the entire time. This is not only problematic with respect to reproducible layer thicknesses but also generates unnecessary powder waste.

The properties of a coating powder are best maintained during conveyance when the coating powder can "flow" as freely and homogeneously as possible without any physical influences. Abrupt directional changes, accelerations, excessive speeds or narrow bending radii are all influences which can change the properties of a coating powder. For optimal charging, proper cloud formation and ultimately the generating of the required layer of powder, the coating powder needs to arrive at the atomizer of the coating gun in as close as possible to its original state.

Therefore, powder pumps which are mounted directly on the powder container are preferably used so to realize an extremely short and rigid suction line. Once at the powder pump, a perfectly straight and non-interrupted powder channel within the pump ensures a gentle transport of powder, which particularly benefits sensitively reacting types of powder such as metallic or structural powder.

The atomized air is added directly at the coating gun and is thus completely separate from the powder transport. This enables ideal powder cloud formation in form/speed and at the same time prevents a pulsing cloud of powder and thus uneven powder charging, which results in irregularities in the coating pattern.

At least two powder circuits are preferably provided, wherein only fresh powder is used for the powder supply of a first gun group and a fresh/recovery powder mix for a further gun group.

The invention claimed is:

1. A coating booth for coating vehicle rims or other rotationally symmetric workpieces with coating material, wherein the coating booth comprises:

a coating chamber having a booth floor, two oppositely positioned side walls, each having a workpiece passageway, two side walls oppositely positioned and adjoining the side walls with the workpiece passageways and a booth roof positioned opposite from the booth floor;

a conveyor device for transporting the workpieces to be coated through the coating chamber, wherein the conveyor device is arranged beneath the booth floor and has a workpiece carrier which extends into the coating chamber of the coating booth through a conveyance slot in the booth floor; and an applicator system for spraying coating material within the coating booth as needed, wherein the applicator system comprises a first gun system for spraying coating material as needed onto a first area of the workpieces to be coated, a second gun system for spraying coating material as needed onto a second area of the workpieces to be coated, and a third gun system for spraying coating material as needed onto a third area of the workpieces to be coated, wherein the first gun system is assigned a first axis system for the positioning and/or aligning of the first gun system relative to the workpieces to be coated during a coating procedure, wherein the second gun system is assigned a second axis system for the positioning and/or aligning of the second gun system relative to the workpieces to be coated during a coating procedure, and wherein the third gun system is assigned a third axis system for the positioning and/or aligning of the third gun system relative to the workpieces to be coated during a coating procedure, wherein the first, second and third axis system are configured such that only the first gun system moves asynchronously to the traveling conveyor device whereas the second and third gun system move synchronously with the conveyor movement.

2. The coating booth according to claim 1, wherein the first gun system is designed to spray coating material as needed onto a visible area of the workpieces to be coated, wherein the second gun system is designed to spray coating material as needed onto a side region of the workpieces to be coated adjacent to the visible area, and wherein the third gun system is designed to spray coating material as needed onto a rear area of the workpieces to be coated opposite from the visible area.

3. The coating booth according to claim 1, wherein the first, second and third axis system are each designed as a system which travels along with the workpieces to be coated as the workpieces to be coated are transported through the coating chamber, wherein each axis system is movable relative to the coating chamber along the side walls adjoining the side walls with the workpiece passageways, wherein the axis systems are designed so as to move synchronously with a conveying speed of the conveying device.

4. The coating booth according to claim 1, wherein the second and third axis system are each connected to the respectively assigned gun system via an opening formed in a side wall adjacent to the side walls with the workpiece passageways, and wherein the second and third axis system are connected to the respectively assigned gun system via the same opening in a side wall adjoining the side walls with the workpiece passageways.

5. The coating booth according to claim 1, wherein the second and third axis system have a common transport device for jointly moving the second and third gun system relative to the coating chamber and synchronously with the workpieces to be coated transported through the coating chamber via the conveyor device.

6. The coating booth according to claim 5, wherein the first axis system has a transport device independent of the second and third axis system which is designed to move the first gun system relative to the coating chamber and in particular asynchronously to the workpieces to be coated transported through the coating chamber via the conveyor device and independently of the common transport device of the second and third axis system.

7. The coating booth according to claim 1, wherein the first axis system is assigned a robotic arm system able to be moved together with the first gun system over the conveyor device and over the workpieces to be coated relative to the coating chamber and relative to the workpieces to be coated with the aid of robotic guidance.

8. The coating booth according to claim 1, wherein the second and third axis system are each assigned a linear positioning system for independent positioning and/or aligning of the second and third gun system relative to the workpieces to be coated.

9. The coating booth according to claim 1, wherein the first gun system comprises at least one first coating gun and at least one further second coating gun, and wherein the first axis system is assigned a control device designed to control the first axis system such that the at least one first coating gun and the at least one further second coating gun each have a predefined and/or definable position and/or alignment relative to the workpieces to be coated, wherein the predefined and/or definable position and/or alignment depends on the type and/or size of the workpieces to be coated.

10. The coating booth according to claim 1, wherein the first gun system comprises at least one first coating gun and at least one further second coating gun, wherein the at least one first coating gun is movable and/or alignable relative to the workpieces to be coated independently of the at least one further second coating gun.

11. The coating booth according to claim 10, wherein the first gun system comprises at least two further coating guns, wherein the at least two further coating guns are movable and/or alignable relative to the workpieces to be coated independently of each other.

12. The coating booth according to claim 1, wherein the second gun system comprises at least one first coating gun and at least one further second coating gun, wherein the at least one first coating gun is movable and/or alignable relative to the workpieces to be coated independently of the at least one further second coating gun; and/or wherein the third gun system comprises at least one first coating gun and at least one further second coating gun, wherein the at least one first coating gun is movable and/or alignable relative to the workpieces to be coated independently of the at least one further second coating gun.

13. The coating booth according to claim 1, wherein the coating gun is an electrostatic coating gun designed to electro-statically charge the coating material to be sprayed with the coating gun, wherein the coating gun is assigned a control device for the controlling and/or regulating of currents in the coating material charging process.

14. The coating booth according to claim 1, wherein at least sections of the booth floor surrounding the conveyance slot are of ramped design, wherein at least one air blowing device is provided for pulsed blowing of a flow of air along the ramped section of the booth floor toward at least one extraction duct provided in the booth floor.

15. The coating booth according to claim 14, wherein the at least one air blowing device is provided at the conveyance slot, and wherein at least one further air blowing device is provided on or in at least one side wall of the coating booth adjoining the side walls with the workpiece passageways which is designed to blow a pulsed flow of air along the booth floor off toward the at least one extraction duct provided in the booth floor.

16. A system for coating vehicle rims or other rotationally symmetric workpieces with coating material, wherein the system comprises the following:

a coating booth comprising:

a coating chamber having a booth floor, two oppositely positioned side walls, each having a workpiece passageway, two side walls oppositely positioned and adjoining the side walls with the workpiece passageways and a booth roof positioned opposite from the booth floor;

a conveyor device for transporting the workpieces to be coated through the coating chamber, wherein the conveyor device is arranged beneath the booth floor and has a workpiece carrier which extends into the coating chamber of the coating booth through a conveyance slot in the booth floor; and an applicator system for spraying coating material within the coating booth as needed, wherein the applicator system comprises a first gun system for spraying coating material as needed onto a first area of the workpieces to be coated, a second gun system for spraying coating material as needed onto a second area of the workpieces to be coated, and a third gun system for spraying coating material as needed onto a third area of the workpieces to be coated; and a coating material supply for supplying coating material to the gun systems, wherein the coating material supply is designed to only supply fresh coating material to the first gun system and to supply fresh coating material along with recovery material or only recovery material to the second and third gun system.

17. The system according to claim 16, wherein the coating material supply has at least one coating material pump for each gun system, wherein the coating material pump is based on the dense flow principle and designed for continuous coating material conveyance.

18. The system according to claim 17, wherein the coating material pump is a dense phase pump having at least one pump chamber, wherein the at least one pump chamber is provided in a perfectly straight and non-interrupted powder channel of the coating material pump.

* * * * *